United States Patent Office 3,335,150
Patented Aug. 8, 1967

3,335,150
CERTAIN 1,2-PHTHALYL-CARBAZOLE
PIGMENTS
Erich Dietz, Kelkheim, Taunus, Otto Fuchs and Erich Schinzel, Frankfurt am Main, and Dieter Wagner, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed Aug. 6, 1963, Ser. No. 300,158
Claims priority, application Germany, Aug. 7, 1962, F 37,545
6 Claims. (Cl. 260—316)

The present invention relates to novel pigment dyestuffs which are very suitable for dyeing lacquers, plastic masses and printing pastes and to a process for preparing them; more particularly it relates to 1,2-phthalyl-carbazole pigment dyestuffs of the general formula

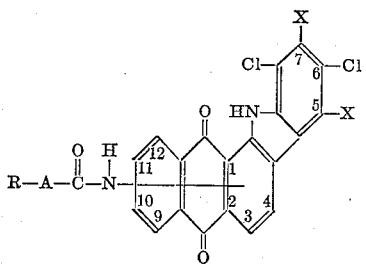

in which X represents a hydrogen, chlorine or bromine atom and the acylamino group in linked in 3- or 9-position and in which A represents (a) an aliphatic hydrocarbon radical, (b) the phenylene group or (c) the naphthylene group and R is identical with the 1,2-phthalyl-carbazole-aminocarbonyl radical linked to the radical A of the above formula, if A is defined as sub (a) and (c) and R represents a lower alkoxy, alkylamino, alkoylamino, trifluoroalkyl, alkylsulfonyl group or a fluorine atom, if A is defined as sub (b) and (c).

It is known that substituted α-phenylamino-anthraquinones the phenyl radical of which is substituted at least in paraposition can be converted into 1,2-phthalyl-carbazoles by treating them with acid condensing agents and that the carbazole cyclization involved takes place in a smooth reaction and with satisfactory yield only if an aroylamino group is situated in one of the remaining α-positions of the anthraquinone nucleus. Since the course of the carbazole cyclization reaction largely depends on the nature of the aroylamino group linked to the anthraquinone nucleus only very definite aroylamino-1,2-phthalyl-carbazoles can be prepared with good yield and satisfactory purity by known processes. Moreover, the carbazole cyclization reaction fails when using α-phenylamino-anthraquinones substituted in 4- or 5-position by an aliphatic acylamino group.

It has now been found that 1,2-phthalyl-carbazole pigment dyestuffs which are very suitable for dyeing lacquers, plastic masses and printing pastes and have the general formula

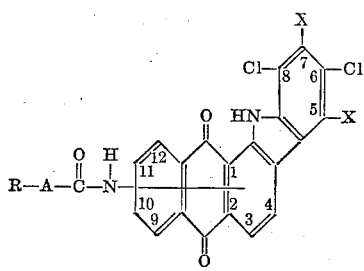

in which X represents a hydrogen, chlorine or bromine atom or an alkyl radical and the acylamino group is linked in 3- or 9-position and in which (1) A represents an aliphatic hydrocarbon radical and R is identical with the 1,2-phthalyl-carbazole-minocarbonyl radical linked to radical A or
(2) A represents an aromatic hydrocarbon radical and R represents a hydrogen atom, an alkyl, alkoxy, alkylamino or acylamino, trifluoroalkyl, alkylsulfonyl radical or a halogen atom or R is identical with the 1,2-phthalyl-carbazole-aminocarbonyl radical bound to radical A can be prepared by acylating aminophthalyl-carbazoles of the above formula in which the group R—A—CO— is replaced by a hydrogen atom, with aliphatic or aromatic dicarboxylic acids or with substituted or unsubstituted aromatic monocarboxylic acids.

The process of the present invention has the advantage that 1,2-phthalyl-carbazoles can be prepared with good yield and high purity which are substituted in 3- or 9-position by acylamino groups which, if introduced into the molecule before the carbazole cyclization reaction, would give the reaction an undesired direction or which would be unstable under the reaction conditions. This is the case, for example, with aliphatic carboxylic acid radicals which provoke a different condensation, or with alkoxy-aryl-carboxylic acid radicals the ether group of which is split under the reaction conditions of the cyclization reaction.

The aminophthalyl-carbazoles containing the amino group in 3- or 9-position which are used as starting material can be prepared from aroylamino-1,2-phthalyl-carbazoles by splitting off the aroyl radical in sulfuric acid of 90% strength. As starting material easily accessible benzoylamino - phthalyl - carbazoles are advantageously used. The aroylamino-1,2-phthalyl-carbazoles can be prepared by treating α-phenylamino-α',-aroylamino-anthraquinones, the phenyl group of which is substituted at least in 2- and 4-position by chlorine atoms and which carry the aroylamino group in 4- or 5-position of the anthraquinone radical, with acid condensing agents.

The acylation is carried out in high-boiling point solvents as, for example, nitrobenzene, di- or trichlorobenzene, at temperatures ranging from about 100° to 220° C. The optimum temperature to be used in each individual case has to be adapted to the reaction components used. The carboxylic acids are advantageously used in the form of their acid halides as, for example, acid chlorides which, if desired, can be prepared in the solvent used from the acid and thionyl chloride.

As acid halides are particularly suitable those of aliphatic and aromatic dicarboxylic acids as, for example, acid halides of succinic acid, terephthalic aid or 4,4'-diphenyl-dicarboxylic acid and those of substitution aromatic monocarboxylic acids, whereby the substitution in 4-position is especially favorable in respect of the fastness properties of the pigment dyestuffs. As substituents there may be used, for example, alkyl, alkoxy, alkylamino and acylamino, trifluoroalkyl, alkyl sulfonyl radicals and halogen atoms.

During the acylation in the organic solvent the dyestuffs crystallize, the crystals being obtained partly in such finely divided form that grinding is not required any more. In those cases where coarser crystals are formed, the dyestuffs can easily be brought into a finely divided form by the processes usually applied, as for example grinding with inorganic salts.

The dyestuffs are distinguished by very good fastness properties. The lacquers and high-polymer materials into which the dyestuffs had been incorporated show an excellent fastness to light. The fastness to solvents, the fastness to bleeding of the dyeings in plasticized polyvinyl chloride and the fastness to overspraying of the lacquers are very good, too.

The following examples serve to illustrate the invention, but they are not intended to limit it thereto, the parts being by weight unless otherwise stated.

*Example 1*

8.3 parts of 5,6,8-trichloro-9-amino-1,2-phthalyl-carbazole (prepared by splitting off the benzoyl group of 5,6,8-trichloro-9-benzoylamino-1,2-phthalyl - carbazole in sulfuric acid of 90% strength at 90° C.) and 3.75 parts of 4-methoxybenzoyl chloride are heated at 130° C. for 3 hours in 200 parts of 1,2-dichlorobenzene. The solution is then heated to boiling temperature for a short time, cooled to 150° C., stirred at 150° C. for 1 hour, filtered off in the hot and washed with hot dichlorobenzene and alcohol. The dyestuff is obtained in the form of yellow-orange needles. They melt at 405° to 406° C. with decomposition. The yield is 10.5 parts which corresponds to a yield of 95.5% of the theory.

The lacquers and plastic masses into which the dyestuff had been incorporated are distinguished by a clear yellow-orange shade, an excellent fastness to light, solvents, bleeding and overspraying.

Dyestuffs of similar fastnes properties and shade are obtained when using in the above example instead of 4-methoxybenzoyl chloride equivalent amounts of the chlorides of 4-chlorobenzoic acid, 4-bromo-benzoic acid, 2- or 4-fluoro-benzoic acid, phthalic acid, isophthalic acid, terephthalic acid or 4,4'-diphenyl-dicarboxylic acid.

*Example 2*

9.12 parts of 5,6,8-trichloro-3-amino-1,2-phthalyl-carbazole are heated to 70° C. in 200 parts of 1,2,4-trichlorobenzene. At this temperature 1.55 parts of succinic acid dichloride are added dropwise. The temperature is raised to 115° C., kept at 115° C. for 3 hours, the mixture is then heated at 180° C. for 3 hours and filtered while still hot. The filtrate is washed with hot trichlorobenzene and alcohol. The dystuff obtained with a yield of 8.5 parts (93% of the theory) crystallizes in the form of red-violet prisms having a melting point of between 388° and 392° C. It dyes lacquers and thermoplastic masses bluish-red shades. The dyeings possess very good fastness properties.

Dyestuffs of similar fastness properties are obtained, when reacting in the above example aminophthalyl-carbazole, for example, with 4-trifluoro-methylbenzoyl chloride, 1,4-naphthalene-dicarboxylic acid dichloride or 2-methoxybenzoyl chloride.

*Example 3*

4.3 parts of p-chlorobenzoyl chloride are added dropwise at 150° C. to a solution of 7.6 parts of 6,8-dichloro-9-amino-phthalyl-carbazole in 100 parts of nitrobenzene. The reaction mixture is stirred for 2 hours at 150° C., cooled to 100° C., allowed to stand for another hour at 100° C. and then filtered while still hot. The filtrate is washed first with a small amount of hot nitrobenzene and then with cold alcohol. 9.2 parts of a dyestuff crystallizing in the form of yellow-orange needles are obtained which corresponds to a yield of 89% of theory. The melting point is above 400° C. The dyestuff has the formula

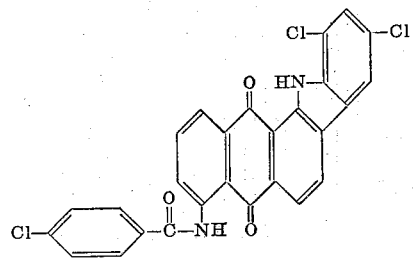

It dyes lacquers and plastic masses reddish-yellow shades. The dyeings possess very good fastness properties.

When using in the above example instead of p-chlorobenzoyl chloride the halides of 3-methylsulfonyl-benzoic acid, 3-ethoxybenzoic acid or 4-acetamino-benzoic acid, dyestuffs of similar shade and comparable fastness properties are obtained.

*Example 4*

9 parts of 5,6,7,8-tetrachloro-9-aminophthalyl-carbazole are dissolved at boiling temperature in 600 parts of 1,2,4-trichlorobenzene, the solution is then cooled to 200° C. and a solution of 2 parts of terephthalyl chloride in 20 parts of 1,2,4-trichlorobenzene is added dropwise. After a short time the dyestuff precipitates in the form of long crystal needles. It is stirred at 200° C. for a further 2 hours, filtered off while still hot and washed with hot trichlorobenzene and alcohol. There are obtained 10 parts which correspond to a yield of 97% of the theory. The dyestuff obtained has the formula

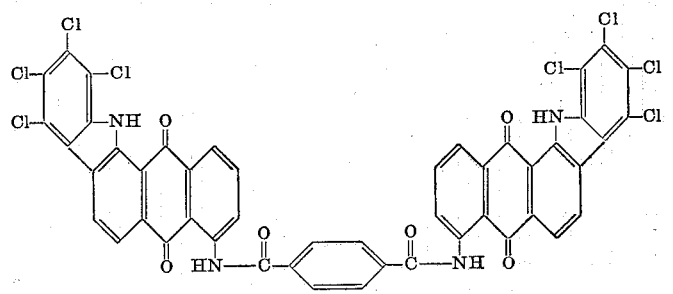

We claim:
1. A compound of the formula

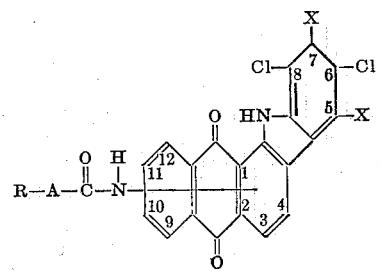

in which X represents a member of the group consisting of a hydrogen atom, a chlorine atom and a bromine atom, A represents divalent lower alkylene, phenylene, naphthylene, or diphenylene, R represents 1,2-phthalylcarbazole-aminocarbonyl as defined in the above-formula, and R also represents lower alkoxy, lower alkylamino, lower alkanoyl amino, trifluoro lower alkyl, lower alkylsulfonyl, or fluorine when A is phenylene, and in which the alkanoylamino RACONH— is in the 3-position or the 9-position.

2. The compound of the formula

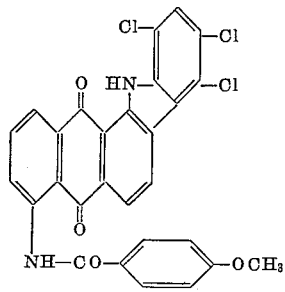

3. The compound of the formula

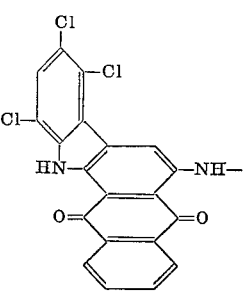

4. The compound of the formula

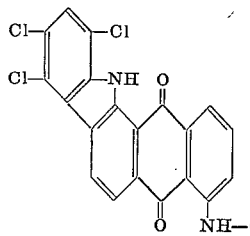

5. The compound of the formula

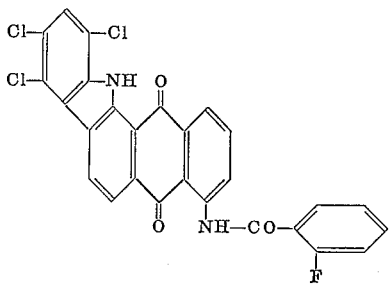

6. The compound of the formula

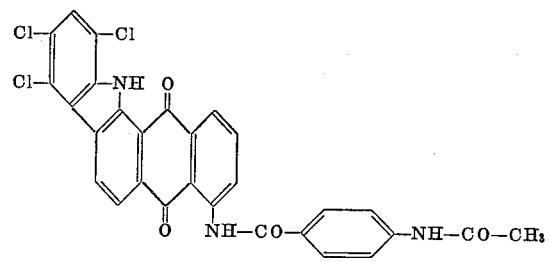

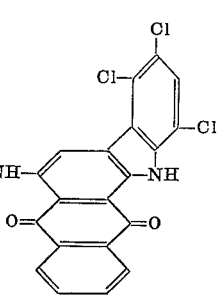

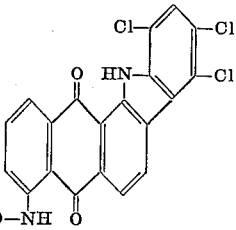

References Cited
FOREIGN PATENTS
228,135  11/1943  Switzerland.

WALTER A. MODANCE, *Primary Examiner.*
JOHN D. RANDOLPH, *Examiner.*
ROBERT T. BOND, *Assistant Examiner.*